March 14, 1967 K. M. ALLEN ETAL 3,308,898
VIBRATED FLOW CONTROL VALVE AND WEIGHER
Original Filed Feb. 14, 1963 2 Sheets-Sheet 1

KENNETH M. ALLEN
CHESTER H. HARPER
INVENTORS.

BY
BUCKHORN, BLORE, KLARQUIST & SPARKMAN
ATTORNEYS

KENNETH M. ALLEN
CHESTER H. HARPER
INVENTORS.

BY
BUCKHORN, BLORE, KLARQUIST & SPARKMAN
ATTORNEYS

United States Patent Office 3,308,898
Patented Mar. 14, 1967

3,308,898
VIBRATED FLOW CONTROL VALVE
AND WEIGHER
Kenneth M. Allen and Chester H. Harper, Newberg,
Oreg., assignors to Allen-Harper, Inc., Newberg, Oreg.,
a corporation of Oregon
Continuation of application Ser. No. 258,502, Feb. 14,
1963. This application Sept. 22, 1965, Ser. No. 495,751
11 Claims. (Cl. 177—64)

This application is a continuation of our copending application, now abandoned Ser. No. 258,502, filed Feb. 14, 1963, for Vibrated Flow Control Valve and Weigher.

This invention relates to methods of and apparatus for metering the flow of granular material, and more particularly to a vibrated flow control valve and methods of controlling the flow of granular material from a hopper to a scales.

An object of the invention is to provide new and improved methods of and apparatus for metering the flow of granular material.

Another object of the invention is to provide a method and apparatus for feeding granular material from a hopper to a restricted orifice and to vary the orifice so as to maintain a uniform rate of flow of the material.

A further object of the invention is to provide a vibrated metering valve.

A still further object of the invention is to provide a valve device normally feeding granular material at a given rate of flow and openable by lumps restricting the flow of the material through the valve device to permit passage of the lumps.

Yet another object of the invention is to provide an apparatus for feeding granular material from a hopper to a scales and operable to shut off the feed of the material when the scales has received a predetermined weight of the material.

A further object of the invention is to provide a method of and apparatus for measuring and discharging a predetermined volume of material.

A still further object of the invention is to provide a vibratory, volume measuring and discharging apparatus.

The invention provides methods of and apparatus for regulating the flow of granular material. In an apparatus forming one embodiment of the invention, the material is fed from a hopper to a scales through a regulating valve including a flexible tube extending from the discharge of the hopper and discharging the material to the scales. The flow of material through the tube is regulated by a pair of opposed pinch members which are pressed toward one another to restrict the tube in accordance with the rate that the material is discharged from the tube to a vane, which is responsive to the rate of discharge of the material from the tube. The vane preferably is operable to provide a feedback operation to the pinching members to cause the members to open the tube completely when a large cluster or lump of material restricts the flow to the restricted portion of the tube to permit the lump to pass therethrough, and also regulates the positions of the pinch members so as to maintain a substantially uniform flow of material through the tube. In an apparatus forming an alternate embodiment of the invention there is provided a flexible tube adapted to receive material from the source of material and spaced pairs of pinch members are provided which alternately open and close so that predetermined volumes of material fed to the tube are periodically discharged from the tube.

A complete understanding of the invention may be obtained from the following detailed description of methods of and apparatus for metering the flow of granular material forming specific embodiments thereof, when read in conjunction with the appended drawings, in which.

Figure 1:
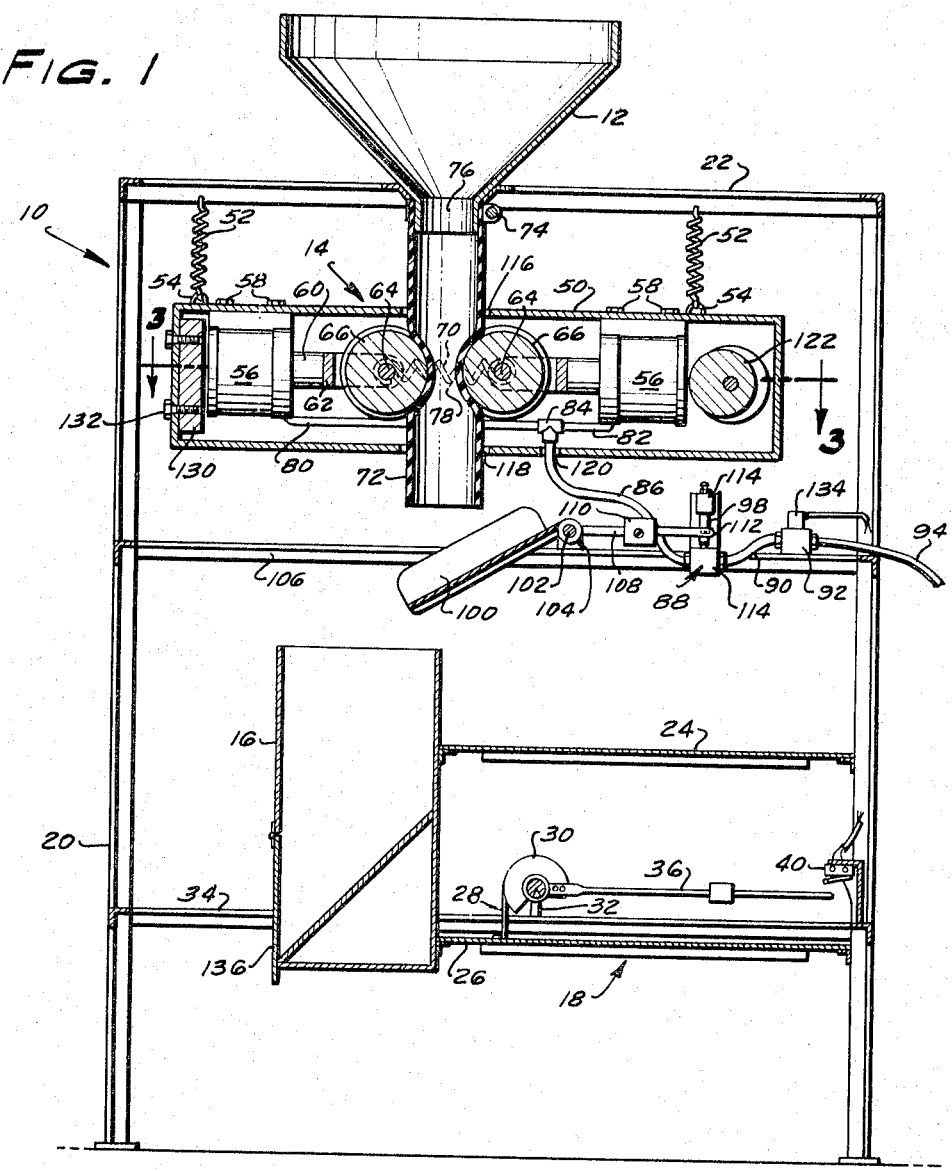
FIG. 1 is a vertical sectional view of an apparatus forming one embodiment of the invention.
Figure 2:
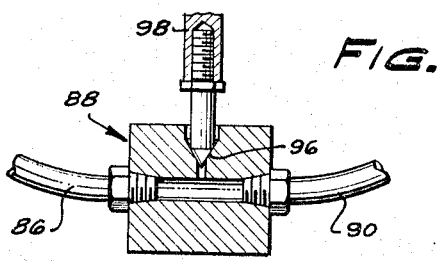
FIG. 2 is an enlarged, fragmentary, vertical sectional view of a bleeder feedback control valve forming a portion of the apparatus shown in FIG. 1.
Figure 3:
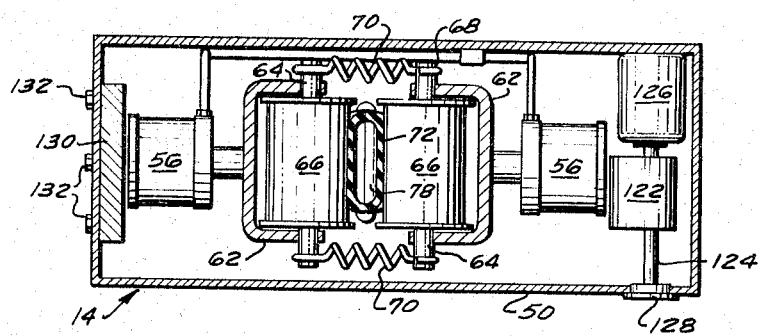
FIG. 3 is a horizontal sectional view taken along line 3—3 of FIG. 1.

Referring now in detail to FIGS. 1 to 3 of the drawings, there is shown therein a batch weighing machine 10 which includes a supply hopper 12 adapted to have therein a supply of granular material such as, for example, salt, sugar, cereal or the like, and feed the material through a vibrated metering device 14 to a receiving hopper 16 forming a part of a scales 18. The machine 10 includes a stationary frame 20 supporting the supply hopper 12 fixedly thereon at the top thereof by means of a top frame portion 22. The hopper 16 of the scales is supported by resilient cantilever members 24 and 26 fixed to the frame 20 at their righthand ends, as viewed in FIG. 1. The hopper 16 also is restrained against downward movement by a flexible cord or cable 28 fixed at its lower end to the member 26 and fixed at its upper end to capstan 30 supported by a knife edge support 32 supported by cross frame member 34. The capstan 30 carries an arm 36 having a counterweight adjustably fixed thereon. When the hopper 16 receives the desired weight of material, it moves to a position in which the arm 36 actuates a limit switch 40 to actuate the vibrated metering device 14 to stop flow of material to the hopper 16, and the hopper 16 then is discharged, after which the switch 40 is released to again start the flow of material from the supply hopper 12.

The vibrated metering device 14 includes a carrier case or frame 50 supported by the top frame portion 22 by means of tension springs 52 fastened at their upper ends to the top frame portion 22 and at their lower ends to eyes 54 fixed to the carrier frame 50. Pneumatic cylinders 56 are fastened to the carrier frame 50 in opposed positions near the opposite ends of the frame 50 by capscrews 58. The cylinders carry therein pistons (not shown) and piston rods 60 having end yokes or clevises 62, in which axles 64 mount flanged rollers 66. The ends of the axles project laterally beyond the yokes 62, as best illustrated in FIG. 3, and have annular grooves 68 therein which retain the ends of tension springs 70. The springs 70 urge the flanged rollers 66 toward each other against a flexible, resilient tube 72 composed of an elastomeric compound such as, for example, rubber or neoprene. The tube 72 is an orifice or valving discharge tube and is fastened at its upper end by a clamping band 74 on the spout or neck portion 76 of the lower, funnel-shaped portion of the supply hopper 12.

The rollers 66 press together the portions of the tube 72 engaged thereby to flatten the tube somewhat and form a restricted orifice portion 78 to meter the flow of granular material through the tube. The ends of the cylinders 56 closest to each other are supplied with air under pressure through conduits 80 and 82, a T-connector 84, a flexible conduit 86, a bleeder valve 88, a conduit 90, a solenoid control valve 92 and a conduit 94 leading to a supply of air under a predetermined pressure. The air supplied to the adjacent ends of the cylinders 56 urges the pistons therein in opposite directions away from each other against the action of the tension springs 70 to limit movement of the rollers 66 toward each other in accordance with the pressure of the air supplied to the cylinder. The pressure of the air supplied to the cylinders is regulated by the bleeder valve 88 which has a needle orifice 96 and a movable valve member 98 whose position is controlled by a vane or chute 100 positioned below the lower, discharge end of the tube 72. The chute 100 serves to deflect the granular material dropping thereon from the tube 72 into the receiving hopper 16 of the scales. The chute 100 is mounted rotatably on a shaft 102 mounted by a bracket 104 on a cross frame 106 of the frame 20, and the chute is fixed rigidly relative to an arm 108 carrying a counterweight 110 adjustably thereon for adjusting the rate of flow. The outer end of the arm 108 is connected by pin-and-slot connection 112 to valve member 98, which is guided for vertical movement by a dashpot 114 fixed to the cross frame 106. It is evident from the construction of the vane 100 and valve 88 that the position of the vane 100, for a given setting of the counterweight 110, is dependent upon the rate of discharge of granular material falling thereon, and, in turn, the amount of air permitted to escape by the valve 88 is determined by the position of the vane 100. The valve 88 determines the pressure of the air supplied to the cylinders 56 to control the spacing of the rollers 66 from each other. The carrier case 50 has enlarged, aligned clearance openings 116 and 118 for the tube 72 and has a clearance opening 120 for the conduit 86.

If a large lump of the material comes to the orifice portion 78 and cannot pass therethrough, the flow of the material past the orifice is reduced. This permits the vane 100 and the arm 108 connected thereto to swing in a clockwise direction, as viewed in FIG. 1, which closes the needle orifice 96 to build up pressure of the air supplied to the cylinders 56 and move the rollers 66 apart to open the tube 72 and the lump drops through the orifice 78. Then the increased flow of material through the orifice 78 falling on the vane 100 pivots the vane 100 in a counterclockwise direction, as viewed in FIG. 1, to open the orifice 96 to reduce the pressure of the air in the cylinders 56 and permit the springs 70 to move the rollers 66 closer together to constrict the orifice 78 until the desired rate of flow of the material is again reached.

In order to maintain uniform continuous flow of material through the tube 72 with its restricted orifice 78, the carrier frame 50 and all the elements carried thereby are vibrated by an eccentric rotor or unbalanced weight 122 rotated by a shaft 124 driven by an electric motor 126 carried by the frame 50 at one side thereof. A bearing 128 mounts the end of the shaft on the side of the frame 50 opposite to the motor 126 and vibrates the rollers 66 and thereby vibrates the tube 72. A balancing weight 130 is secured to the end of the frame 50 opposite to the end thereof at which the motor 122 is positioned. The weight 130 is generally in lateral alignment with the rotor 122. Capscrews 132 secure the weight to the frame.

In the operation of the machine 10, the hopper 12 is at least partially filled with granular material to be weighed in batches, and flows downwardly through the tube 72 and is metered by the restricted orifice 78, the carrier frame 50 being vibrated along with the rollers 66 and the restricted portion of the tube 72 engaged thereby by rotation of the rotor 122 by means of the motor 126. This keeps material flowing through the orifice 78 and avoids bridging of the orifice. The material drops onto the inclined vane 100 and slides off the vane 100 by gravity into the hopper 16. The amount of material on the vane 100 at any time, for a given inclination of the vane, is determined by the rate of flow of the material through the orifice 78. If the rate of flow is greater than that desired, the vane 100 will be pressed in a counterclockwise direction as viewed in FIG. 1 to lower the pressure of the air in the adjacent ends of the cylinders 56. This causes the springs 70 to pull the rollers 66 closer to one another to restrict the orifice 78 to a greater extent which reduces the rate of flow of material therethrough. This permits the vane 100 to move clockwise to cause the rollers 66 to move apart somewhat. The vane 100 and the sides of the orifice 78 reach positions of equilibrium relative to one another, after which the flow of the material through the orifice 78 will be substantially uniform.

The material discharged from the vane 100 accumulates in the receiving hopper 16 of the scales 18, and when the desired weight of material has been discharged from the tube 72, the arm 36 actuates the limit switch 40 to actuate a solenoid 134 of the valve 92 to close off the valve. The air in the adjacent ends of the cylinders 56 then rapidly bleeds off through the valve 88 and comes to atmospheric pressure, and the springs 70 simultaneously move the rollers 66 to positions completely closing the tube 72. A door 136 of the hopper 16 then is opened to discharge the material into a suitable container (not shown) and the scales 18 moves the arm 36 away from the limit switch 40 to again open the valve 92 and restart the flow of material into the hopper 16, the door 136 having been closed.

Since the portion of the tube 72 above the roller 66 is filled with granular material, while the portion of the tube below the rollers 66 is not filled with the material, closing of the rollers causes the portions of the tube engaged by the rollers to move upwardly somewhat and the rollers turn to minimize strain on the tube. These engaged portions of the tube tend to move downwardly somewhat when the rollers are opened and the rollers turn to facilitate this action. The flanges of the rollers maintain the tube between the rollers.

Figure 4:
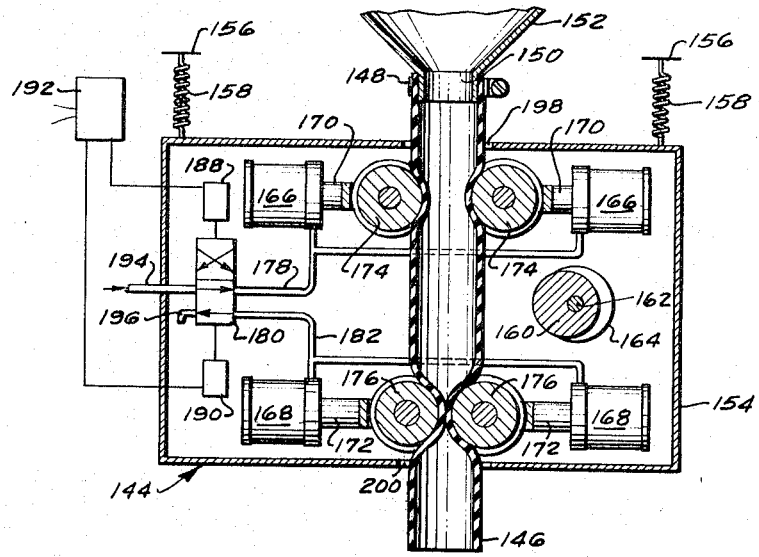
FIG. 4 is a fragmentary, vertical sectional view of an apparatus forming an alternate embodiment of the invention.

In FIG. 4, a volumetric batch dispensing device 144 includes a flexible, resilient tube 146 fastened at its upper end by a clamping band 148 to a discharge spout 150 of a supply hopper 152. A case-like carrier frame 154 is suspended from fixed supports 156 by tension springs 158 and is vibrated continuously during operation by an eccentric weight 160 driven by a shaft 162 rotated by motor 164. The frame 154 carries thereon in adjustable positions, spaced pairs of opposed cylinders 166 and 168, which in turn have piston rods 170 and 172, respectively, carrying opposed flanged rollers 174 and 176, respectively. The adjacent ends of cylinder 166 are connected by branched conduit 178 to valve 180. The adjacent ends of the cylinders 168 are connected by a branched conduit 182 to a second port of the valve 180. The rollers 174 and 176 are urged toward tube-closing positions by tension springs (not shown) like the tension springs 70. The valve 180 includes solenoids 188 and 190, alternate energizations of which are controlled by a timer 192. A conduit 194 leads to the valve 180 from a source of air under pressure, and exhaust conduit 196 is connected to one port of the valve 180. The carrier frame 154 is provided with enlarged clearance openings 198 and 200 to provide clearance between the frame 154 and the tube 146.

During the operation of the apparatus shown in FIG. 4, the rotor 160 is continuously rotated to vibrate the carrier frame 154 and the elements carried thereby to shake down powdered or granular material from the supply hopper 152 to fill the portion of the tube 146 above the rollers 176 which are closing off the lower portion of the tube 146. The vibration also packs the granular material in the tube 146. After a predetermined period of time has elapsed from the start of the filling of the tube 146, which is sufficient for the tube to be filled above the rollers 174, the timer 192 actuates the solenoids 188 and 190 to cause the valve 180 to move from the condition shown in FIG. 4 to a second condition in which the conduit 182 is connected to the conduit 194 to move the rollers 176 to open positions and the conduit 178 is connected to the exhaust conduit 196 to cause the rollers 174 to be moved toward each other to positions closing the upper end of the tube 146. Then all the material below the rollers 174 in the conduit 146 drops down through the lower end of the conduit 146 into a suitable container or package, the material so dropping being a predetermined volume of material packed by the action of the vibrating eccentric rotor 160. The timer 192 then actuates the valve 180 to return to its position shown in FIG. 4 and the rollers 176 close and the rollers 174 open to refill the portion of the tube 146 between these pairs of rollers. The cycle described above will then be repeated.

The cylinders 166 may be adjustable vertically relative to the cylinders 168 to vary the volumetric quantity of the material supplied in each bath, any suitable means being satisfactory for so adjusting the positions of the cylinders 166 vertically relative to the carrier frame 154. For example, a bar carrying both of the cylinders 166 may be held by a pair of adjustment screws carried adjustably by the top of the frame 154 while the cylinders 168 are fixed to the frame 154.

The above described methods and apparatus serve to uniformly feed and meter powdered and granular material. In the apparatus shown in FIGS. 1 to 3 the material is precisely weighed for each batch and in the apparatus shown in FIG. 4 the material is measured volumetrically and is compacted well for each discharge of the batch dispensing device 144.

It is to be understood that the above-described arrangements are simply illustrative of the application of the principles of the invention. Numerous other arrangements may be readily devised by those skilled in the art which will embody the principles of the invention and fall within the spirit and scope thereof.

What is claimed is:

1. In a vibratory flow control valve,
a carrier frame,
means for supporting the carrier frame resiliently,
a vibrating device carried by the frame and vibrating the same,
a resilient tube adapted to guide material therethrough,
and pinch means carried by the frame for constricting a portion of the tube.

2. In a metering device,
a carrier frame,
means for supporting the carrier frame resiliently,
a vibrating rotor device carried by the frame,
a pair of pinch members,
means mounting the pinch members on the frame in spaced apart positions and for relative movement therebetween,
a resilient tube extending between and constricted by the members and adapted to guide material therethrough,
means for moving the members relative to each other between closed positions closing the tube and open positions opening the tube,
and means for feeding material through the tube when the tube is open.

3. In a metering device,
a carrier frame,
means for supporting the carrier frame resiliently,
a vibrating device carried by and vibrating the frame,
a pair of pinch members,
means mounting the pinch members on the frame in spaced apart positions and for relative movement therebetween,
a resilient tube extending between and constructed by the pinch members and adapted to guide material therethrough,
means for adjusting the positions of the pinch members relative to each other to vary the construction of the tube,
and means for feeding material into the tube.

4. The device of claim 3 including an inclined chute positioned below the tube for receiving the material flowing through the tube and movable in accordance with the rate of flow of material through the tube,
and means responsive to movement of the chute for actuating the adjusting means.

5. In a vibratory flow control valving device,
a carrier frame,
means for supporting the carrier frame resiliently,
a vibrating device carried by the frame at one end thereof and vibrating the same,
weight means carried by the frame at the other end thereof,
a resilient tube adapted to guide material therethrough,
and pinch means carried by the frame for constricting a portion of the tube.

6. In a vibratory flow control valving device,
a carrier frame,
means for supporting the carrier frame resiliently,
means carried by the frame for vibrating the frame,
a pair of opposed fluid pressure-actuated devices carried by the frame,
a pair of pinch members carried by the fluid-actuated devices,
and a resilient tube extending between and constricted by the pinch members and adapted to guide material therethrough.

7. In a flow control device,
a resilient tube,
means for supporting the tube in a vertically extending position,
a frame,
means for supporting the frame resiliently,
means for vibrating the frame,
a pair of pinch rollers,
a pair of fluid-actuated mechanisms supporting the pinch rollers on the frame in positions on opposite sides of the tube,
means for supplying fluid under pressure to the fluid-actuated mechanisms,
a sensing vane positioned below the lower end of the tube and biased toward an upper position and movable downwardly by the material discharged from the tube in accordance with the rate of flow of material through the tube,
and means responsive to the sensing vane for regulating the flow of fluid to the fluid-actuated mechanisms to cause the pinch rollers to be adjusted relative to each other in accordance with the rate of flow of material through the tube to the sensing vane.

8. The flow control device of claim 7 and including a scales positioned in the path of material discharged from the vane to receive material from the sensing vane,
and means operable by the scales when a predetermined quantity of material has accumulated thereon for actuating the fluid-actuated means to move the pinch rollers to positions completely closing off the tube.

9. In a flow control valving device,
a resilient tube,
a frame,
means for supporting the frame resiliently,
a pair of aligned cylinders supported by the frame and positioned at opposite sides of the tube,
a pair of piston means carried by the cylinders and extending from the cylinders toward the tube,
a pair of yokes carried by the ends of the piston means,
a pair of rollers,
a pair of axles carrying the rollers in positions engaging opposite sides of the tube and carried by the yokes in positions extending beyond the sides of the yokes,
a pair of tension springs connecting the axles together and engaging the portions of the axles extending beyond the sides of the yokes,
and conduit means for supplying air under pressure to the ends of the cylinders closest to each other to move the piston means apart against the action of the springs.

10. In a flow control valve,
granular material supplying means,
a resilient tube extending downwardly from and receiving material from the material supplying means,
a carrier frame,
means supporting the frame resiliently,
vibrating means for vibrating the carrier frame,
a first pinch means carried by the carrier frame for pinching the lower portion of the tube together to close the tube,
a second pinch means carried by the carrier frame for pinching an upper portion of the tube at a point spaced a predetermined distance above the portion pinched off by the first pinch means to close the tube,
and means for actuating the first pinch means to release the tube and the second pinch means to close the tube after the portion of the tube between the first and second pinch means has been filled with the material.

11. In a flow control valve,
a hopper having a discharge opening,
a resilient tube extending downwardly from the discharge opening of the hopper with the upper end of the tube in position to receive granular material from the discharge opening of the hopper,
a carrier frame,
means mounting the carrier frame resiliently,
a first pinch means for pinching the lower portion of the tube together to close the tube,
a second pinch means for pinching the tube at a point spaced a predetermined distance above the portion pinched off by the first pinch means,
means for alternately opening and closing the first and second pinch means,
and means for vibrating the first and second pinch means.

References Cited by the Examiner

UNITED STATES PATENTS

| | | | |
|---|---|---|---|
| 1,083,959 | 1/1914 | Voglesong | 177—108 |
| 1,558,668 | 10/1925 | Carter | 222—55 |
| 2,008,305 | 7/1935 | Johnson | 177—64 |
| 2,681,751 | 6/1954 | Stone et al. | 222—212 |
| 2,865,537 | 12/1958 | Jackson | 222—214 |
| 2,872,074 | 2/1959 | Birtwell et al. | 222—55 |
| 2,895,653 | 7/1959 | Giepen | 222—88 X |
| 2,936,994 | 5/1960 | Lau. | |
| 3,101,871 | 8/1963 | Lucas et al. | 222—185 |
| 3,198,272 | 8/1965 | Allen et al. | 177—60 |
| 3,232,486 | 2/1966 | Ofner | 222—55 |

RICHARD B. WILKINSON, *Primary Examiner.*

R. S. WARD, *Assistant Examiner.*